United States Patent
Murakami et al.

(10) Patent No.: US 9,388,771 B2
(45) Date of Patent: Jul. 12, 2016

(54) INTAKE CONTROLLER AND METHOD OF INTAKE CONTROLLING FOR INTERNAL COMBUSTION ENGINE

(75) Inventors: Kentaro Murakami, Chigasaki (JP); Yoshiki Kanzaki, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/581,677

(22) PCT Filed: Mar. 1, 2011

(86) PCT No.: PCT/JP2011/054652
§ 371 (c)(1),
(2), (4) Date: Dec. 10, 2012

(87) PCT Pub. No.: WO2011/108549
PCT Pub. Date: Sep. 9, 2011

(65) Prior Publication Data
US 2013/0098033 A1    Apr. 25, 2013

(30) Foreign Application Priority Data

Mar. 1, 2010    (JP) ................. 2010-044625

(51) Int. Cl.
*F02D 23/00*    (2006.01)
*F02B 33/44*    (2006.01)
(Continued)

(52) U.S. Cl.
CPC .............. *F02M 25/077* (2013.01); *F02B 37/18* (2013.01); *F02B 37/22* (2013.01); *F02B 47/08* (2013.01);
(Continued)

(58) Field of Classification Search
CPC .......... F02B 37/18; F02B 37/22; F02B 47/08; F02B 37/183; F02B 37/186; F02B 37/24; F02D 41/0007; F02D 41/0055; F02D 41/029; F02D 41/00024; F02D 41/0245; F02D 41/0255; F02D 41/027; F02D 41/0275; F02D 41/028; F02D 41/0285; F02M 25/077; F02M 25/0707; F01N 3/0253; F01N 9/002; F01N 9/00; Y02T 10/42; Y02T 10/47; Y02T 10/144; Y02T 10/44
USPC .................. 60/274, 295, 602, 605.2
See application file for complete search history.

(56) References Cited

U.S. PATENT DOCUMENTS

| | | | | |
|---|---|---|---|---|
| 6,497,095 B2 * | 12/2002 | Carberry | ................. | F01N 3/023 60/274 |
| 6,931,842 B2 * | 8/2005 | Ohtake | ................... | F01N 3/023 60/280 |

(Continued)

FOREIGN PATENT DOCUMENTS

| CN | 1796741 A | 7/2006 |
|---|---|---|
| CN | 1940262 A | 4/2007 |

(Continued)

OTHER PUBLICATIONS

Official Letter dated Mar. 13, 2013, issued for the German Patent Application No. 11 2011 100 755.8 and English translation thereof.
(Continued)

*Primary Examiner* — Thomas Denion
*Assistant Examiner* — Jessica Kebea
(74) *Attorney, Agent, or Firm* — Locke Lord LLP (57) ABSTRACT

In an intake controller for an internal combustion engine, an opening controlling unit performs, when a light load operation is performed during a manual forced regeneration process of a diesel particulate filter which reduces an amount of particulate matter included in exhaust gas exhausted from the internal combustion engine, control to form a bypass passage by setting an open-close valve to a fully closed state and a variable turbo nozzle to a fully closed state and which performs, when an amount of the injected fuel detected by a fuel injection amount detecting unit becomes zero, control to set the open-close valve from the fully closed state to a fully opened state and the variable turbo nozzle from the fully closed state to a fully opened state.

4 Claims, 7 Drawing Sheets

(51) Int. Cl.
*F01N 3/00* (2006.01)
*F02M 25/07* (2006.01)
*F02B 37/18* (2006.01)
*F02B 37/22* (2006.01)
*F02D 41/00* (2006.01)
*F02B 47/08* (2006.01)
*F02D 41/02* (2006.01)
*F01N 3/025* (2006.01)
*F01N 9/00* (2006.01)

(52) U.S. Cl.
CPC ........ *F02D 41/0007* (2013.01); *F02D 41/0055* (2013.01); *F02D 41/029* (2013.01); *F01N 3/0253* (2013.01); *F01N 9/002* (2013.01); *Y02T 10/144* (2013.01); *Y02T 10/42* (2013.01); *Y02T 10/47* (2013.01)

(56) References Cited

U.S. PATENT DOCUMENTS

| | | | | |
|---|---|---|---|---|
| 7,021,050 | B2* | 4/2006 | Nishimura | F01N 3/023 123/568.11 |
| 7,107,770 | B2* | 9/2006 | Shirakawa | F02D 41/0007 123/305 |
| 7,296,561 | B2* | 11/2007 | Shirakawa | F02D 41/0005 123/493 |
| 7,322,194 | B2 | 1/2008 | Sun et al. | |
| 7,610,757 | B2 | 11/2009 | Onodera | |
| 7,895,838 | B2* | 3/2011 | Ono | F01N 3/035 123/568.11 |
| 7,913,549 | B2* | 3/2011 | Andrasko | F02B 37/24 73/114.36 |
| 8,024,919 | B2* | 9/2011 | Fluga | F01N 3/023 60/274 |
| 8,196,404 | B2* | 6/2012 | Onishi | F02D 41/0065 123/198 DB |
| 8,428,849 | B2* | 4/2013 | Maruyama | F02D 41/0002 60/602 |
| 8,627,660 | B2* | 1/2014 | Ito | F02D 41/0007 123/568.11 |
| 2004/0000139 | A1* | 1/2004 | Kawashima et al. | 60/295 |
| 2004/0031262 | A1* | 2/2004 | Gui et al. | 60/285 |
| 2004/0172935 | A1* | 9/2004 | Otake et al. | 60/295 |
| 2006/0010864 | A1* | 1/2006 | Mulloy et al. | 60/602 |
| 2007/0012030 | A1* | 1/2007 | Shirakawa | 60/285 |
| 2008/0034736 | A1* | 2/2008 | Chiba et al. | 60/291 |
| 2008/0134677 | A1 | 6/2008 | Onodera | |
| 2009/0038308 | A1* | 2/2009 | Nagae | F01N 3/035 60/602 |
| 2011/0146233 | A1* | 6/2011 | Carlill et al. | 60/274 |
| 2011/0146246 | A1* | 6/2011 | Farman et al. | 60/286 |
| 2012/0117963 | A1* | 5/2012 | Hepburn et al. | 60/605.2 |
| 2013/0086887 | A1* | 4/2013 | Bergland | F02B 47/08 60/274 |
| 2013/0213007 | A1* | 8/2013 | Harden et al. | 60/272 |

FOREIGN PATENT DOCUMENTS

| | | |
|---|---|---|
| CN | 101048583 A | 10/2007 |
| DE | 10154151 A1 | 5/2003 |
| EP | 1484497 A2 | 12/2004 |
| JP | 2002-168112 A | 6/2002 |
| JP | 2003-206726 A | 7/2003 |
| JP | 2006-274911 A | 10/2006 |
| JP | 2009-287456 A | 12/2009 |
| WO | WO-2006/011553 A1 | 2/2006 |

OTHER PUBLICATIONS

International Search Report dated Apr. 26, 2011, issued for PCT/JP2011/054652.

Decision of a Patent Grant mailed Oct. 16, 2012, issued for the corresponding Japanese Patent Application No. 2012-503195 and English translation thereof.

* cited by examiner

INTAKE CONTROLLER AND METHOD OF INTAKE CONTROLLING FOR INTERNAL COMBUSTION ENGINE

FIELD

The present invention relates to an intake controller and a method of intake controlling for an internal combustion engine.

BACKGROUND

In an engine for a construction machine such as a bulldozer and a large dump truck, there may be a case that abrupt deceleration occurs from a driving state in a middle-high speed range and a middle-high load range. Specifically, in a case with a bulldozer, the above occurs when a decelerator pedal is depressed during a soil carrying operation at middle-high speed. In a case with a dump truck, the above occurs when an accelerator pedal is unintentionally returned while running uphill at middle-high speed in a sediment-loaded state.

Figure 9:
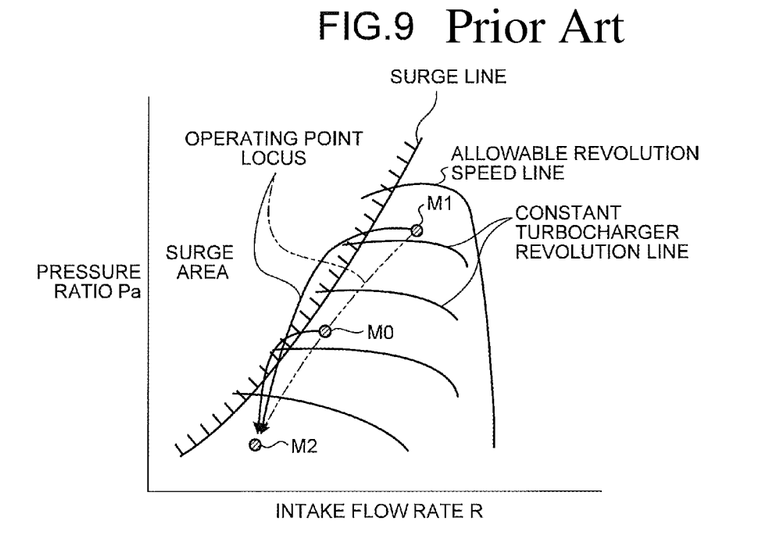
FIG. 9 is an explanatory view for variation of an operating point of an exhaust turbocharger when abrupt deceleration occurs respectively from a state of operating at a middle-high speed range and a middle-high load range and a state of operating at a low-middle speed range and a low-middle load range.

In such a case, when an exhaust turbocharger is mounted on the internal combustion engine, as illustrated in FIG. 9, an operating point M1 of the exhaust turbocharger is shifted to an operating point M2 as passing on a locus indicated by a solid line from a middle-high speed range and middle-high load range side to a low speed range side so as to achieve matching with the engine at the operating point M2. The exhaust turbocharger rotates a turbine by using exhaust gas exhausted from the internal combustion engine and performs intake supercharging to the internal combustion engine by driving a compressor with rotational force of the turbine. Here, the horizontal axis of FIG. 9 denotes an intake flow rate of the exhaust turbocharger and the vertical axis of FIG. 9 denotes a pressure ratio of the compressor.

However, since the operating point temporarily enters into a surge area across a surge line at some midpoint while the operating point is shifted from the operating point M1 to the operating point M2 owing to abrupt deceleration, there occurs surging to destabilize operation of the exhaust turbocharger with fluctuation of intake pressure. This is because revolution of the exhaust turbocharger remains at high speed owing to inertia thereof despite a state that substantial amount of intake air is not required as the engine revolution speed being abruptly dropped as a result of depressing of a decelerator pedal or unintentional returning operation of an accelerator pedal. Then, the surging may cause strong self-exited vibration at the compressor side and may cause breakage in some cases.

Based on such a situation, there has been proposed an intake controller which lessens inflow resistance of intake air at an outlet passage side of the compressor as feeding intake air to an inlet passage side of the turbine from the outlet passage side of the compressor by controlling an open-close valve of an exhaust gas recirculation passage from a fully closed state into a fully opened state while using an exhaust gas recirculation passage reversely to normal use, in a case that the internal combustion engine is abruptly decelerated from a driving state in a middle-high speed range and a middle-high load range (see Patent Literature 1). According to such an intake controller, since entering of the operating point of the exhaust turbocharger into a surge area can be suppressed, surging occurrence at the exhaust turbocharger can be suppressed as the operating point of the exhaust turbocharger becoming to pass on a locus indicated by a two-dot chain line in FIG. 9, for example.

CITATION LIST

Patent Literature

Patent Literature 1: WO 06/011553

SUMMARY

Technical Problem

By the way, in order to reduce particulate matter (PM) included in exhaust gas, a DPF (diesel particulate filter) is arranged at an exhaust pipe which is connected subsequently to the exhaust turbine. The DPF exhausts exhaust gas to the outside after reducing PM such as soot included in exhaust gas. When much PM is trapped by the DPF, the filtering function is decreased. When PM is further increased, the exhaust pipe is to be blocked. Therefore, a regeneration process to combust trapped PM is performed at the DPF. The regeneration process has a natural regeneration process to naturally combust PM as exhaust gas temperature rising in accordance with increase of load and a forced regeneration process. When PM is increased, the forced regeneration process is to be performed. In the forced regeneration process, PM is forcedly combusted by increasing exhaust temperature and performing dosing to inject fuel antecedently to the DPF. The forced regeneration process has an automatic forced regeneration process and a manual forced regeneration process. When there is a possibility that the DPF is blocked as a PM amount being extremely increased, the manual forced regeneration process based on a manual instruction corresponding to warning is performed. In the manual forced regeneration process, PM is forcedly combusted by stopping a vehicle, increasing exhaust temperature as the exhaust gas recirculation passage being fully closed, further increasing exhaust temperature by lessening work to a turbine vane rotor with exhaust gas, and performing the abovementioned dosing.

Here, there has been a desire to perform light load operation such as surface sloping operation and hanging operation even during the manual forced regeneration process. In a case of performing light load operation during the manual forced regeneration process, the exhaust gas recirculation passage is in fully closed state as being under the manual forced regeneration operation and work to the turbine vane rotor is lessened via a bypass passage as a variable turbo nozzle being in a fully closed state. Therefore, intake air is supplied from the compressor owing to inertia of the rotating turbine when an amount of fuel injected is abruptly decreased during light load operation. Accordingly, there has been a problem of surging occurrence even with light load operation.

To address the above issues, it is an object of the present invention to provide an intake controller and a method of intake controlling for an internal combustion engine capable of controlling to perform the manual forced regeneration process and to suppress surging even when light load operation is performed during the manual forced regeneration operation.

Solution to Problem

To overcome the problems and achieve the object, according to the present invention, an intake controller for an internal combustion engine, comprises: an exhaust gas recirculation passage which extracts a part of exhaust gas exhausted from the internal combustion engine to recirculate the extracted exhaust gas to an intake passage side of the internal combustion engine; an open-close valve which is arranged at the exhaust gas recirculation passage and which controls a flow rate of the exhaust gas to be circulated through the exhaust gas recirculation passage; a fuel injection amount detecting unit which detects an amount of fuel injected into the internal combustion engine; a turbine which is rotated by the exhaust gas exhausted from the internal combustion engine; a compressor which is driven with rotation of the turbine and which sucks and compresses external air to supply the air to the internal combustion engine; a variable turbo nozzle which controls flow speed of the exhaust gas to be supplied to the turbine with nozzle opening adjustment of a slide mechanism and which forms a bypass passage to lessen work to the turbine via the slide mechanism when the slide mechanism is fully closed; and an opening controlling unit which performs, when a light load operation is performed during a manual forced regeneration process of a diesel particulate filter which reduces an amount of particulate matter included in exhaust gas exhausted from a diesel engine, control to form the bypass passage by setting the open-close valve to a fully closed state and the variable turbo nozzle to a fully closed state and which performs, when the amount of injected fuel detected by the fuel injection amount detecting unit becomes zero, control to set the open-close valve from the fully closed state to a fully opened state and the variable turbo nozzle from the fully closed state to a fully opened state.

According to the present invention, a method of intake controlling for an internal combustion engine including: an exhaust gas recirculation passage which extracts a part of exhaust gas exhausted from the internal combustion engine to recirculate the extracted exhaust gas to an intake passage side of the internal combustion engine; an open-close valve which is arranged at the exhaust gas recirculation passage and which controls a flow rate of the exhaust gas to be circulated through the exhaust gas recirculation passage; a turbine which is rotated by the exhaust gas exhausted from the internal combustion engine; a compressor which is driven with rotation of the turbine and which sucks and compresses external air to supply the air to the internal combustion engine; a variable turbo nozzle which controls flow speed of the exhaust gas to be supplied to the turbine with nozzle opening adjustment of a slide mechanism and which forms a bypass passage to lessen work to the turbine via the slide mechanism when the slide mechanism is fully closed, wherein the method comprises: a detecting step to detect an instruction of a manual forced regeneration process of a diesel particulate filter which reduces an amount of particulate matter included in exhaust gas exhausted from a diesel engine; a full-close controlling step to form the bypass passage by setting the open-close valve to a fully-closed state and the variable turbo nozzle to a fully closed state when the instruction of the manual forced regeneration process is detected in the detecting step; and a full-open controlling step to perform controlling to set the open-close valve from the fully-closed state to a fully opened state and the variable turbo nozzle from the fully closed state to a fully opened state when an amount of fuel injected becomes zero.

Advantageous Effects of Invention

According to the present invention, when light load operation is performed during a manual forced regeneration process of a diesel particulate filter which reduces an amount of particulate matter included in exhaust gas exhausted from a diesel engine, it is controlled to form a bypass passage which does not supply exhaust gas to a turbine by setting an open-close valve arranged at an exhaust gas recirculation passage to a fully closed state and a variable turbo nozzle of the turbine to a fully closed state and to set the open-close valve from the fully closed state to a fully opened state and the variable turbo nozzle from the fully closed state to a fully opened state when an amount of fuel injected becomes zero. Therefore, surging occurrence can be suppressed even when light load operation is performed during the manual forced regeneration process.

DESCRIPTION OF EMBODIMENTS

In the following, a structure of an internal combustion engine and a method of intake controlling therefore will be described as an embodiment of the present invention with reference to the drawings.

[Structure of Internal Combustion Engine]

First, a structure of an internal combustion engine according to an embodiment of the present invention will be described with reference to FIG. 1.

Figure 1:
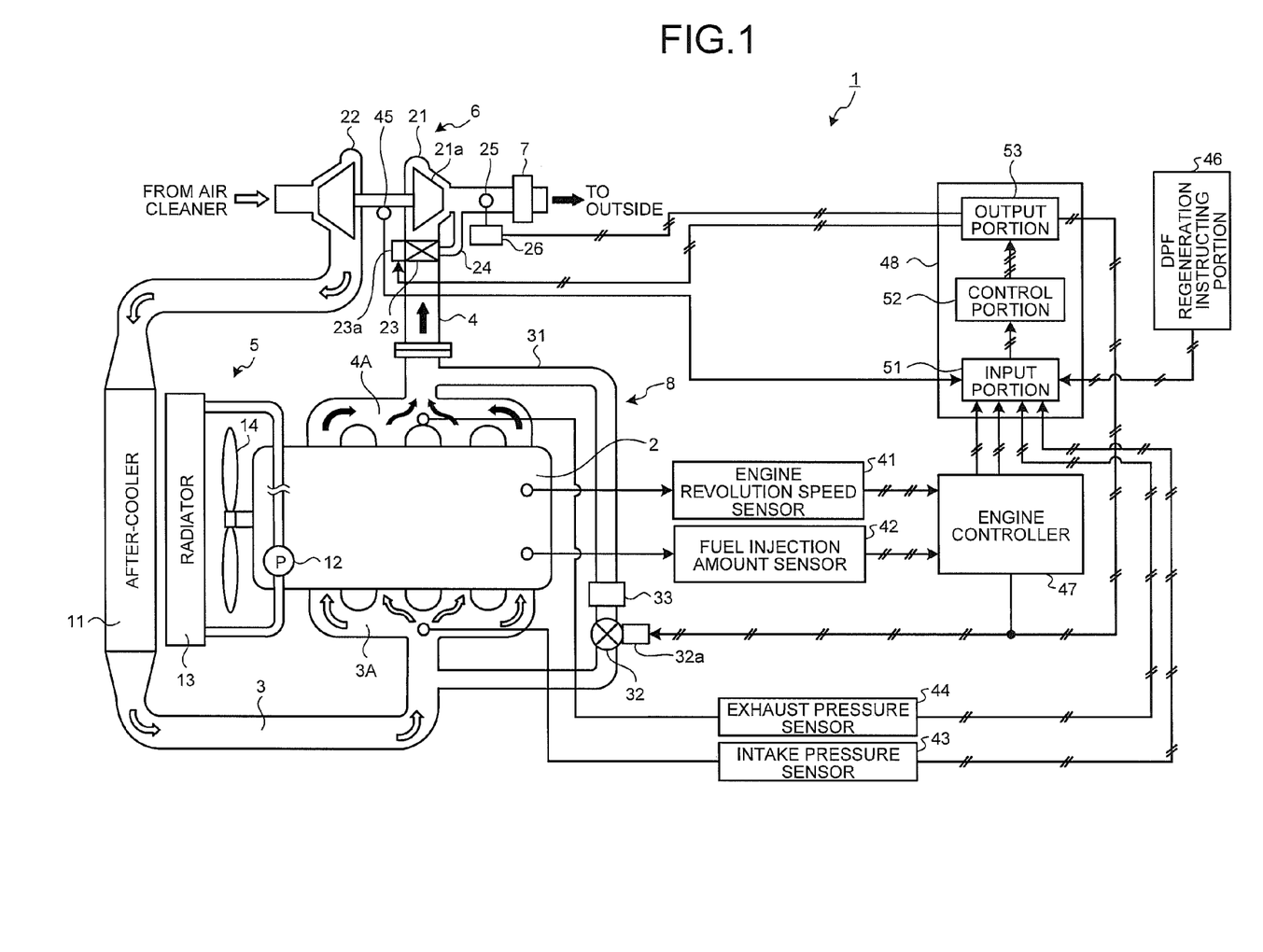
FIG. 1 is a schematic view illustrating a structure of an internal combustion engine according to a first embodiment of the present invention.

FIG. 1 is a schematic view illustrating the structure of the internal combustion engine according to an embodiment of the present invention. As illustrated in FIG. 1, an internal combustion engine 1 being structured by a diesel engine includes an engine main body 2 having a plurality (four in the present embodiment) of combustion rooms formed at the inside thereof, an intake pipe 3 which supplies intake air to the respective combustion rooms in the engine main body 2, an exhaust pipe 4 which exhausts exhaust gas exhausted from the respective combustion rooms in the engine main body 2, a cooling mechanism 5, an exhaust turbocharger 6, a DPF 7, and an exhaust gas recirculation system 8.

An intake manifold 3A is attached between the engine main body 2 and the intake pipe 3 so that intake air from the intake pipe 3 is distributed to the respective combustion rooms in the engine main body 2. An exhaust manifold 4A is attached between the engine main body 2 and the exhaust pipe 4 so that exhaust gas exhausted from the respective combustion rooms in the engine main body 2 collectively inflows to the exhaust pipe 4.

An after-cooler 11 which cools air compressed by the exhaust turbocharger 6 is arranged at the intake pipe 3. The cooling mechanism 5 includes a pump 12 which is driven by a crank shaft (not illustrated) and the like arranged in the engine main body 2. Cooling water pressure-fed by the pump 12 is to be air-cooled by a radiator 13 arranged at the cooling mechanism 5 after cooling portions which require to be cooled such as the engine main body 2, the exhaust turbocharger 6, an oil cooler (not illustrated) and the like. The after-cooler 11 and the radiator 13 are arranged at the engine main body 2 and the cooling action thereof is accelerated with a fan 14 which is rotationally driven by the crank shaft (not illustrated) and the like.

The exhaust turbocharger 6 includes a turbine 21 which is arranged at a midway of the exhaust pipe 4, a compressor 22 which is arranged at a midway of the intake pipe 3 and is driven by being interlocked to the turbine 21, a variable turbo nozzle 23 which controls flow speed of exhaust gas to be supplied to the turbine 21, and a variable turbine actuator 23a which controls the degree of a nozzle opening of the variable turbo nozzle 23. The exhaust turbocharger 6 controls revolution speed of the turbine 21 by controlling the degree of the opening of the variable turbo nozzle 23 with the variable turbo actuator 23a. Supercharging of intake air to the engine main body 2 is performed as the compressor 22 being operated with rotation of the turbine 21. Here, when the variable turbo nozzle 23 is fully closed, exhausting is performed to the DPF 7 side via a bypass passage 24. That is, when the variable turbo nozzle 23 is opened, a turbine vane rotor 21a is made to work by supplying exhaust gas thereto. When the variable turbo nozzle 23 is fully closed, work to the turbine vane rotor 21a is lessened to increase exhaust temperature by outputting exhaust gas to the DPF 7 side via the bypass passage 24.

Figure 2A:
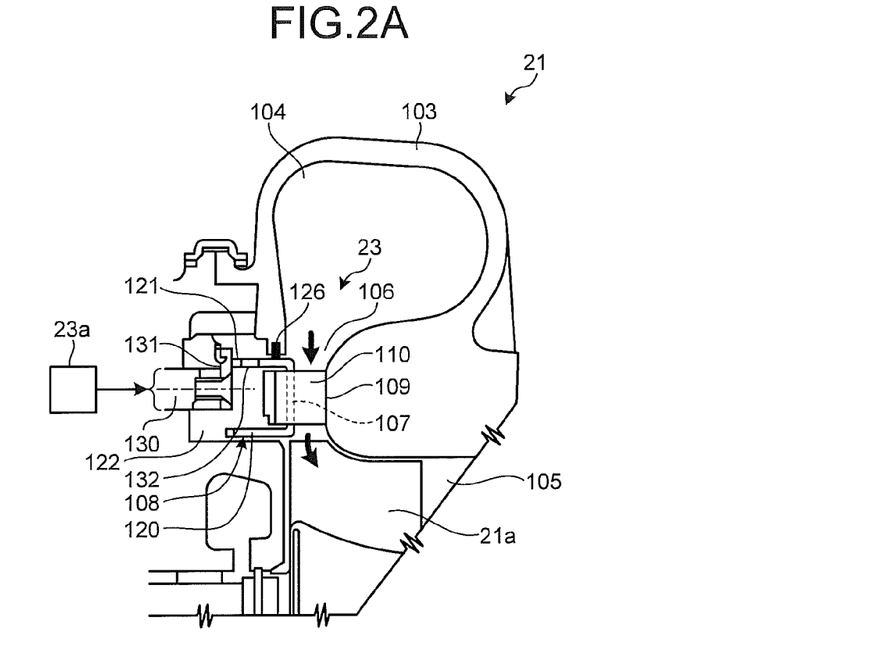
FIG. 2A is a sectional view illustrating a structure at the vicinity of a variable turbo nozzle in a state that the variable turbo nozzle is fully opened.
Figure 2B:
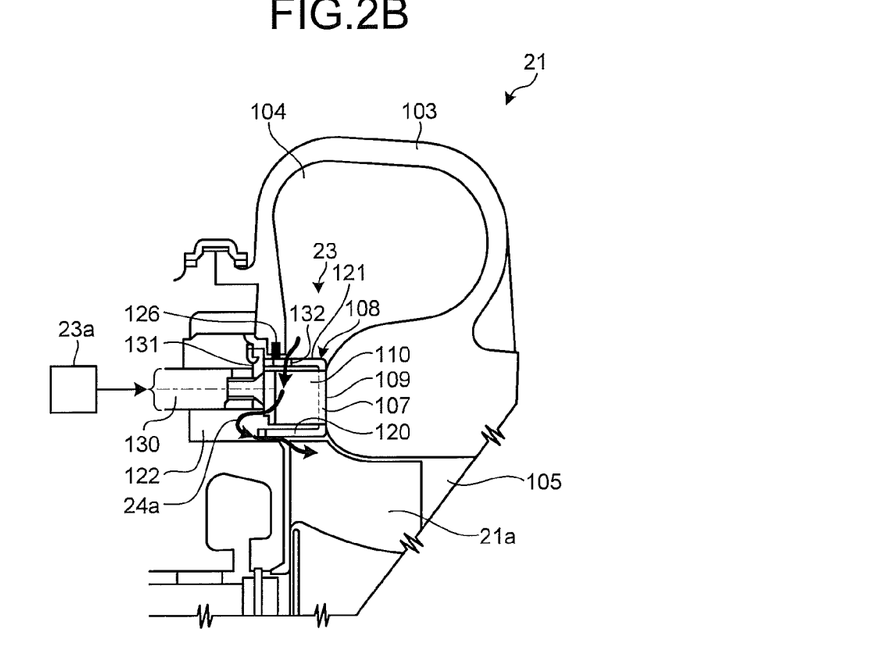
FIG. 2B is a sectional view illustrating a structure at the vicinity of the variable turbo nozzle in a state that the variable turbo nozzle is fully closed.

Here, an example of the variable turbo nozzle 23 will be described with reference to FIGS. 2A and 2B. FIG. 2A is a sectional view illustrating a structure at the vicinity of the variable turbo nozzle 23 when the variable turbo nozzle 23 is fully opened. Further, FIG. 2B is a sectional view illustrating a structure at the vicinity of the variable turbo nozzle 23 when the variable turbo nozzle 23 is fully closed. The turbine 21 varies flow speed of exhaust gas by using the variable turbo nozzle 23 which varies nozzle opening area with a slide mechanism. In FIGS. 2A and 2B, a circular inlet passage 106 is formed between an inlet chamber 104 which is connected to the exhaust pipe 4 and an outlet passage 105 to which the turbine vane rotor 21a is arranged. The degree of opening of the inlet passage 106 is adjusted as a circular nozzle ring 108 being slid in the axial direction (the right-left direction in the drawings) as the slide mechanism. The nozzle ring 108 includes a circular radial wall 107 extended in the radial direction, an inner circular flange 120 extended to a circular cavity 122 side, and an outer circular flange 121. A nozzle vane 110 is arranged at the inlet passage 106 along the outer circumferential direction of the turbine vane rotor 21a. Then, a slit corresponding to the nozzle vane 110 is formed at the radial wall 107 and the nozzle vane 110 is inserted to the slit. Further, a guide rod 130 is connected to the nozzle ring 108 via a connection plate 131. Movement of the guide rod 130 in the axial direction (the right-left direction in the drawings) is controlled by the variable turbo actuator 23a. The nozzle ring 108 is slid in the axial direction by controlling the variable turbo actuator 23a. Thus, the degree of the opening of the inlet passage 106 is adjusted and the turbine vane rotor 21a is rotated in accordance with an amount of an exhaust gas inflowing to the turbine vane rotor 21a from the inlet chamber 104.

Further, an opening 132 arranged in the circumferential direction is formed at the outer circular flange 121. Meanwhile, a circular groove is formed at a turbine housing 103 which is contacted to the outer circular flange 121 and a ring seal 126 is arranged at the groove. The opening 132 is formed so as to be located at the guide rod 130 side from the ring seal 126 when the nozzle ring 108 is fully opened as illustrated in FIG. 2A and so as to be located at the inlet passage 106 side from the ring seal 126 when the nozzle ring 108 is fully closed as illustrated in FIG. 2B. Accordingly, as illustrated in FIG. 2B, when the nozzle ring 108 is fully closed, the inlet passage 106 is closed as the radial wall 107 and a radial wall 109 at the turbine housing 103 side are contacted and exhaust gas inflows to the circular cavity 122 via the opening 132. Here, since a ring seal is not arranged between the inner circular flange 120 and the turbine housing 103, exhaust gas in the circular cavity 122 outflows to the outlet passage 105 via clearance between the inner circular flange 120 and the turbine housing 103. Since the outflow direction of exhaust gas outflowing between the inner circular flange 120 and the turbine housing 103 is to be the axial direction of the turbine vane rotor 21a, exhaust gas performs small work to the turbine vane rotor 21a and outflows to the outlet passage 105 as exhaust gas in a high temperature state. A detour passage 24a of exhaust gas at the time when the nozzle ring 108 is fully closed is the bypass passage 24 illustrated in FIG. 1. Here, decrease in efficiency of the exhaust turbocharger 6 can be varied by varying the number, dimensions, shapes and location of the openings 132.

Returning to FIG. 1, a dosing nozzle 25 which injects dosing fuel supplied from a dosing fuel supplying apparatus 26 is arranged between the turbine 21 and the DPF 7. Injection of the dosing fuel is performed when a forced regeneration process is instructed.

The DPF 7 exhausts exhaust gas after reducing an amount of PM included in exhaust gas exhausted from the exhaust pipe 4. PM is accumulated in the DPF 7. The abovementioned forced regeneration process and the like is performed to eliminate an excessively accumulated state.

The exhaust gas recirculation system 8 includes an exhaust gas recirculation passage 31 which provides communication between the exhaust manifold 4A and the intake pipe 3. The exhaust gas recirculation passage 31 recirculates a part of exhaust gas extracting from the exhaust manifold 4A to the intake pipe 3. The exhaust gas recirculation passage 31 is provided with an EGR valve 32 as an opening-closing valve which opens and closes the exhaust gas recirculation passage 31, an EGR valve actuator 32a which controls the degree of an opening of the EGR valve 32, and an EGR cooler 33 which cools exhaust gas from the exhaust manifold 4A. The exhaust gas recirculation system 8 reduces oxygen concentration in intake air and decreases combustion temperature of the engine main body 2 by flowing back a part of exhaust gas to the intake manifold 3A via the exhaust gas recirculation passage 31. Thus, it is possible to reduce an amount of nitrogen oxide included in exhaust gas.

As a control system, the internal combustion engine 1 includes an engine revolution speed sensor 41, a fuel injection amount sensor 42, an intake pressure sensor 43, an exhaust pressure sensor 44, a turbine revolution speed sensor 45, a DPF regeneration instructing portion 46, an engine controller 47, and an actuator controller 48. The engine revolution speed sensor 41 detects revolution speed of the crank shaft (not illustrated) of the engine main body 2 and inputs a signal indicating revolution speed of the crank shaft (not illustrated) to the engine controller 47.

The fuel injection amount sensor 42 detects an amount of fuel injected to the combustion rooms in the engine main body 2 by detecting a position of a governor of a fuel injection pump (not illustrated) or calculating the amount of the injected fuel from fuel pressure at a common rail, open time of an electromagnetic valve of the fuel injection nozzle and the like when the common rail is arranged. The fuel injection amount sensor 42 inputs a signal indicating the amount of injected fuel to the engine controller 47. The fuel injection amount sensor 42 functions as a fuel injection amount detecting unit according to the present invention.

The intake pressure sensor 43 detects intake pressure between an outlet passage of the compressor 22 and the intake manifold 3A and inputs a signal indicating intake pressure to the actuator controller 48. The exhaust pressure sensor 44 detects exhaust pressure between the exhaust manifold 4A and an inlet passage of the turbine 21 and inputs a signal indicating exhaust pressure to the actuator controller 48. The turbine revolution speed sensor 45 detects revolution speed of the turbine 21 and inputs a signal indicating the revolution speed of the turbine 21 to the actuator controller 48. The DPF regeneration instructing portion 46 instructs to perform the forced regeneration process (an automatic forced regeneration process and a manual forced regeneration process) of the DPF 7 in accordance with instruction from an operator or a control apparatus.

The engine controller 47 is actualized with a microcomputer which includes a CPU, RAM, ROM, input-output circuits and the like. The CPU in the engine controller 47 controls operation of the internal combustion engine 1 as loading a control program stored in the ROM into the RAM and performing the control program loaded into the RAM. Specifically, the engine controller 47 determines an operational state of the internal combustion engine 1 such as deceleration action based on signals from the engine revolution speed sensor 41, the fuel injection amount sensor 42, a decelerator pedal (not illustrated), and an accelerator pedal and controls the amount of injected fuel, fuel injection timing and the like to the combustion rooms in the engine main body 2 in accordance with the determined operational state. The engine controller 47 transfers signals from the engine revolution speed sensor 41 and the fuel injection amount sensor 42 to the actuator controller 48. Here, in a case that the manual forced regeneration instruction is provided from the DPF regeneration instructing portion 46, the engine controller 47 performs compulsory control to provide low engine revolution speed and low engine torque. The engine controller 47 functions as a deceleration action detecting unit according to the present invention. Here, even for determining the operational state of the internal combustion engine 1, the engine controller 47 may function as a fuel injection amount detecting unit according to the present invention.

The actuator controller 48 is actualized with a microcomputer which includes a CPU, RAM, ROM, input-output circuits and the like and is provided with an input portion 51, a control portion 52, and an output portion 53. The input portion 51 receives signals output from the fuel injection amount sensor 42, the intake pressure sensor 43, the exhaust pressure sensor 44, and the turbine revolution speed sensor 45 and inputs the received signals to the control portion 52. The control portion 52 controls the degree of the opening of the variable turbo nozzle 23 with the variable turbo actuator 23a and controls the degree of the opening of the EGR valve 32 with the EGR valve actuator 32a based on the signals input from the input portion 51. The output portion 53 outputs an opening control signal from the control portion 52 to the variable turbo actuator 23a and the EGR valve actuator 32a. The actuator controller 48 functions as an opening controlling unit according to the present invention. Further, in a case that instruction to perform the forced regeneration process is received from the DPF regeneration instructing portion 46, the actuator controller 48 outputs an instruction to the dosing fuel supplying apparatus 26 to inject fuel from the dosing nozzle 25.

Figure 3:
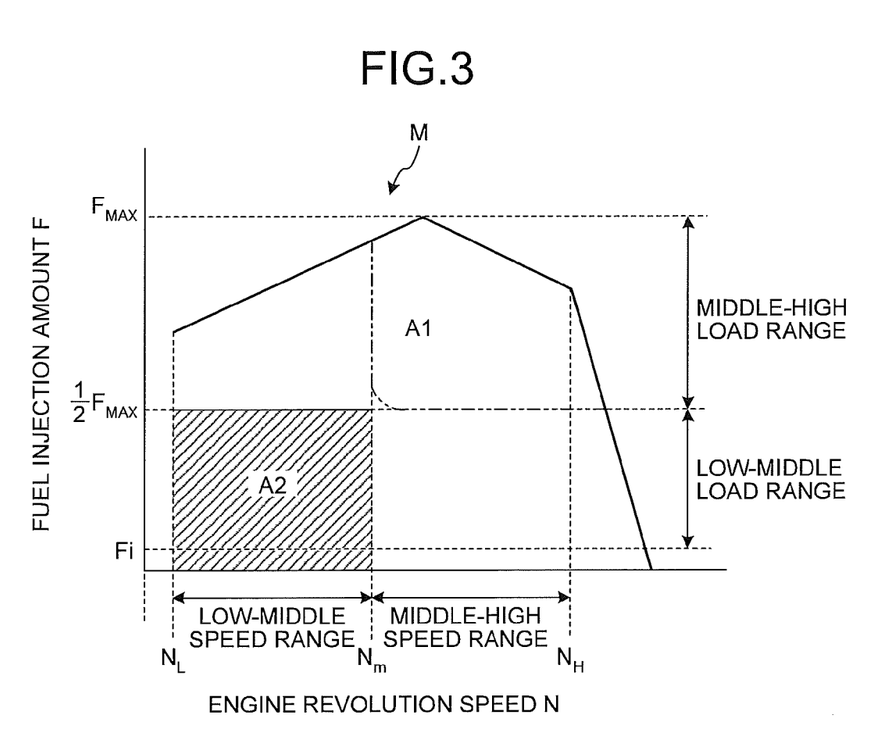
FIG. 3 is a map indicating relation between a manual forced regeneration process and an operational state of the internal combustion engine.

Here, description will be performed on the manual forced regeneration process of the DPF 7 and the operational state of the internal combustion engine 1 by using FIG. 3. Traditionally, only the manual forced regeneration process has been performed as stopping a vehicle without being loaded. In the present embodiment, even in the manual forced regeneration process, it is possible to perform light load operation as illustrated by an area A2 in FIG. 3, that is, operation in the area having low load and low revolution speed of the internal combustion engine 1 can be performed while suppressing occurrence of surging. FIG. 3 is a map M indicating the operational state of the internal combustion engine 1. In FIG. 3, a reference sign Nm indicates predetermined revolution speed of the internal combustion engine 1 (engine revolution speed) as a boundary between a low-middle speed range and a middle-high speed range. Specifically, the reference sign Nm indicates engine revolution speed (for example, 1450 rpm) calculated with a formula as being $\{(NH-NL)/2\}+NL$ as low idling revolution speed and high idling revolution speed being denoted by NL (for example, 800 rpm) and NH (for example, 2100 rpm) respectively. That is, the low-middle speed range denotes a range where the engine revolution speed N is not less than the low idling revolution speed NL and is less than the engine revolution speed Nm. The middle-high speed range denotes a range where the engine revolution speed N is not less than the engine revolution speed Nm and is less than the high idling revolution speed NH.

Further, in FIG. 3, a reference sign Fi denotes an idling injection amount. Further, a reference sign ½ Fmax denotes a predetermined fuel injection amount of the internal combustion engine 1 as a boundary between a low-middle load range and a middle-high load range as denoting a half value of a maximum fuel injection amount Fmax of the internal combustion engine 1. That is, the low-middle load range denotes a range where the fuel injection amount F is not less than the idling injection amount Fi and is less than the fuel injection amount ½ Fmax. The middle-high load range denotes a range where the fuel injection amount F is not less than the fuel injection amount ½ Fmax and is less than the maximum fuel injection amount. Accordingly, the operational state of the internal combustion engine 1 in an area A1 illustrated in FIG. 3 is in the middle-high speed range and middle-high load range. Further, the operational state of the internal combustion engine 1 in the area A2 illustrated in FIG. 3 is in the low-middle speed range and the low-middle load range. Then, as described above, the present embodiment enables to perform light load operation in the area A2 without causing surging even when the manual forced regeneration process is performed.

[Intake Control Process]

With the internal combustion engine 1 having the above-mentioned structure, the actuator controller 48 performs an intake control process described in the following, so that surging occurrence at the exhaust turbocharger 6 is suppressed even when light load operation is performed in the area A2 during the manual forced regeneration process. Here, during the manual forced regeneration process, only the light load operation can be performed. Here, as described above, during the manual forced regeneration process, the engine controller 47 compulsory controls to have low engine revolution speed and low engine torque. In the following, procedure of the intake control process to be performed by the actuator controller 48 will be described with reference to a flowchart indicated in FIG. 4.

Figure 4:
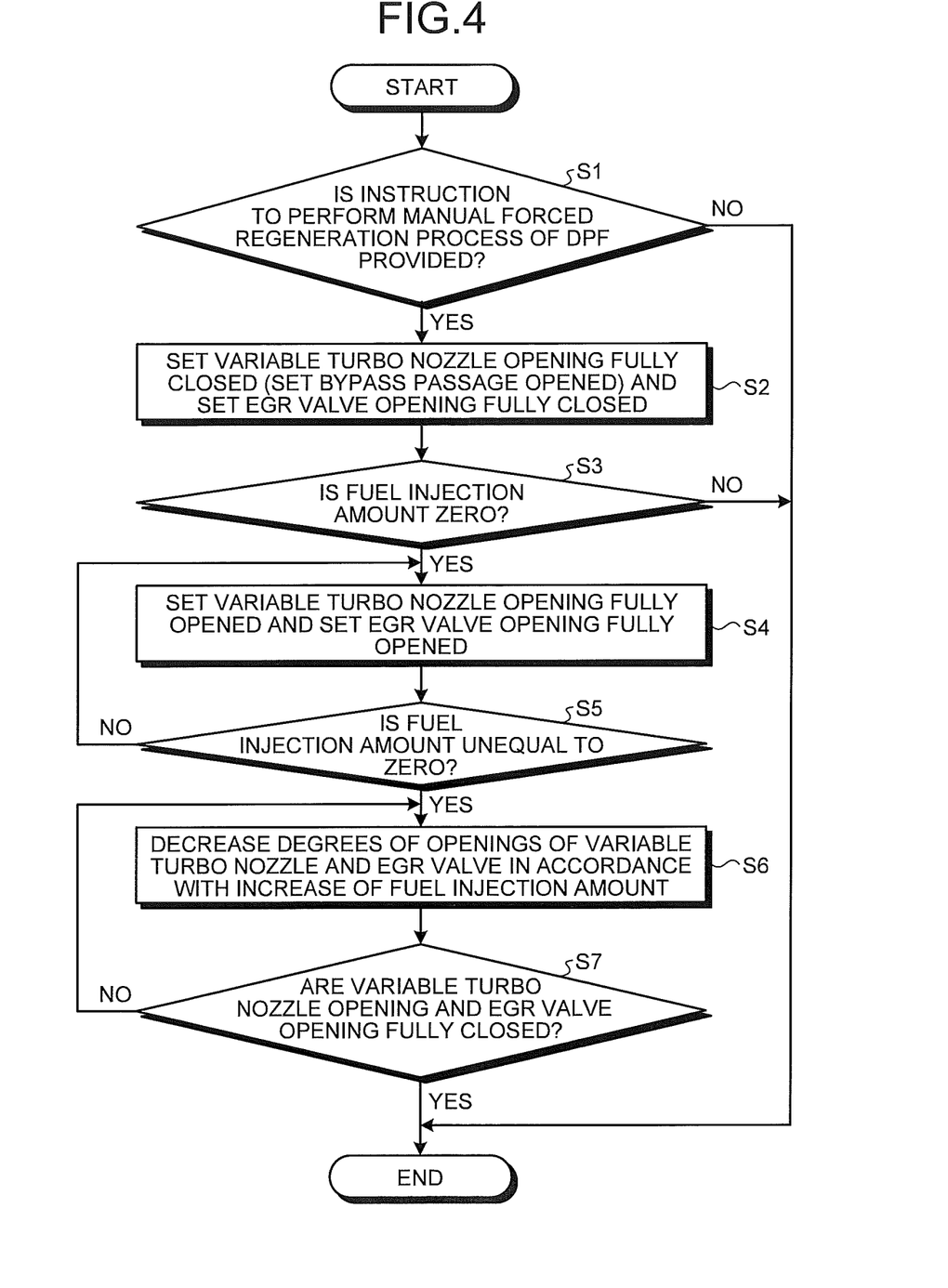
FIG. 4 is a flowchart describing procedure of an intake control process with an actuator controller.

FIG. 4 is a flowchart describing the procedure of the intake control process to be performed by the actuator controller 48. The intake control process to be performed by the actuator controller 48 is started at the timing when an ignition switch of a construction machine on which the internal combustion engine 1 is mounted is switched from an OFF-state to an ON-state and the intake control process proceeds to step S1. The intake control process is repeatedly performed for each predetermined control cycle during the ignition switch of the construction machine is maintained in the ON-state.

In a process of step S1, the control portion 52 of the actuator controller 48 determines whether or not an instruction to perform the manual forced regeneration process of the DPF 7 is provided based on the input signal from the DPF regeneration instructing portion 46 input via the input portion 51. As a result of the determination, when the instruction to perform the manual forced regeneration process of the DPF 7 is not provided ("No" in step S1), the control portion S2 ends a series of the intake control process. On the other hand, when the instruction to perform the manual forced regeneration process of the DPF 7 is provided ("Yes" in step S1), the control portion 52 forwards the intake control process to a process of step S2.

In the process of step S2, the degrees of the nozzle opening of the variable turbo nozzle 23 and the opening of the EGR valve 32 are controlled to be in a fully closed state with controlling of the variable turbo actuator 23a and the EGR valve actuator 32a by the control portion 52 of the actuator controller 48. In this case, the bypass passage 24 is to be in an opened state from a closed state. Exhaust gas is to be supplied directly to the DPF 7 side via the bypass passage 24 by controlling the degrees of the nozzle opening of the variable turbo nozzle 23 and the opening of the EGR valve 32 in the fully closed state. As a result, since the work to the turbine vane rotor 21a is lessened, temperature of exhaust gas supplied to the DPF 7 is to be in a high temperature state. Further, exhaust gas from the engine main body 2 is to be also in a high temperature state as the EGR valve 32 being in the fully closed state. Accordingly, when temperature of exhaust gas supplied to the DPF 7 becomes to predetermined temperature or higher, the manual forced regeneration process in which dosing fuel supplied from the dosing fuel supplying apparatus 26 is combusted and PM (especially, soot) is combusted owing to being in a higher temperature state is performed.

Thus, the process of step S2 is completed and the intake control process proceeds to a process of step S3.

In the process of step S3, the control portion 52 of the actuator controller 48 determines whether or not the amount of injected fuel becomes zero based on the input signal from the fuel injection amount sensor 42. Here, as the process of step S3, it is also possible to determine whether or not abrupt deceleration of the internal combustion engine 1 causing the amount of injected fuel to be zero occurs. Here, it is also possible that the control portion 52 determines that abrupt deceleration occurs at the internal combustion engine 1 when engine revolution speed decrease decelerator depressing, accelerator releasing or the like is detected. When the amount of injected fuel becomes zero ("Yes" in step S3) the control portion 52 forwards the intake control process to a process of step S4. On the other hand, when the amount of injected fuel does not become zero ("No" in step S3), the control portion 52 ends the series of intake control process.

Figure 5:
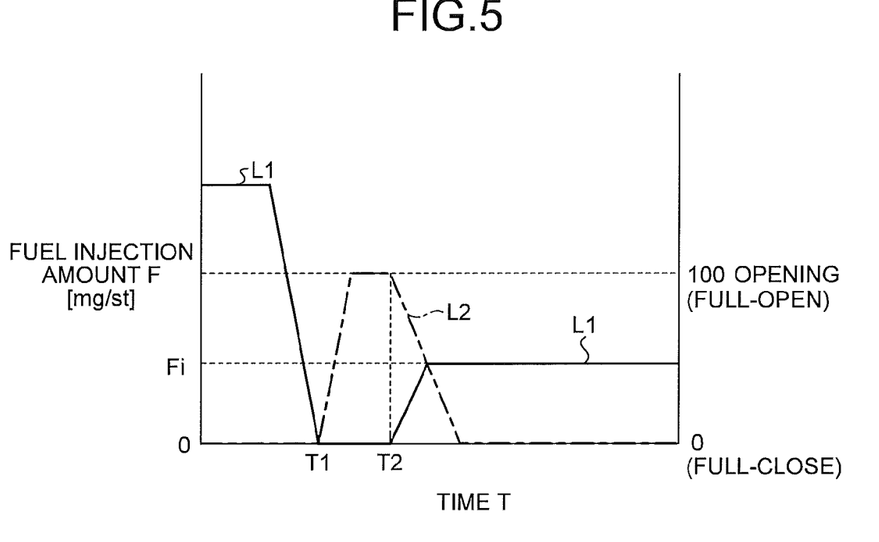
FIG. 5 is a timing chart indicating the intake control process with the actuator controller.

Here, the process of step S3 will be specifically described with reference to FIG. 5. In FIG. 5, the horizontal axis denotes time T. Further, the vertical axis at the left side of a graph of FIG. 5 denotes the fuel injection amount F and a solid line L1 indicates temporal variation of the fuel injection amount F. Further, the vertical axis at the right side of the graph of FIG. 5 denotes the nozzle opening of the variable turbo nozzle 23 and a chain line L2 indicates temporal variation of the nozzle opening of the variable turbo nozzle 23. When the internal combustion engine 1 is abruptly decelerated, the fuel injection amount F is once cut by the engine controller 47 to be zero at time T being T1, and then, is rebounded to the idling fuel injection amount Fi as starting fuel injection at time T being T2, as indicated by the solid line L1 in FIG. 5. Accordingly, the actuator controller 48 determines that the internal combustion engine 1 is abruptly decelerated at time T being T1 in FIG. 5, that is, at the timing when the fuel injection amount F becomes zero. Then, in a case that the fuel injection amount F becomes zero, the control portion 52 forwards the intake control process to the process of step S4. On the other hand, in a case that the fuel injection amount does not become zero, the control portion 52 ends the series of the intake control process. Here, when the degree of the nozzle opening of the variable turbo nozzle 23 is fully closed, it is under the manual forced regeneration process.

In the process of step S4, the degrees of the nozzle opening of the variable turbo nozzle 23 and the opening of the EGR valve 32 are controlled to be in a fully opened state with controlling of the variable turbo actuator 23a and the EGR valve actuator 32a by the control portion 52 of the actuator controller 48. Specifically, the control portion 52 of the actuator controller 48 controls the variable turbo actuator 23a and the EGR valve actuator 32a, so that the degrees of the nozzle opening of the variable turbo nozzle 23 and the opening of the EGR valve 32 are controlled to be in the fully opened state as indicated by the chain line L2 in FIG. 5. Flow speed of exhaust gas supplied to the turbine 21 is decreased by controlling the degree of the nozzle opening of the variable turbo nozzle 23 to be in the fully opened state. Further, owing to that the degree of the opening of the EGR valve 32 is controlled to be in the fully opened state, intake air in the intake passage 3 is bypassed to the inlet passage side of the turbine 21 from the outlet passage side of the compressor 22 via the exhaust gas recirculation passage 31. Accordingly, inflow resistance of intake air at the outlet passage side of the compressor 22 becomes small. Therefore, since an operating point of the exhaust turbocharger 6 is to be shifted from an operating point M0 to an operating point M2 as passing on a locus indicated by a two-dot chain line in FIG. 9, it is possible to suppress surging occurrence of the exhaust turbocharger 6 due to entering of the operating point into a surge area. Thus, the process of step S4 is completed and the intake control process proceeds to a process of step S5.

In the process of step S5, the control portion 52 of the actuator controller 48 determines whether or not the amount of injected fuel becomes unequal to zero based on the input signal from the fuel injection amount sensor 42. Then, when the amount of injected fuel becomes unequal to zero (at the time T2 in FIG. 4), the control portion 52 of the actuator controller 48 forwards the intake control process to a process of step S6.

In the process of step S6, the control portion 52 of the actuator controller 48 controls the variable turbo actuator 23a and the EGR valve actuator 32a based on the input signal from the fuel injection amount sensor 42, so that the degrees of the nozzle opening of the variable turbo nozzle 23 and the opening of the EGR valve 32 are decreased from the fully opened state toward the fully closed state in accordance with increase of the amount of injected fuel as indicated by a wave shape L2 in FIG. 5. Specifically, the actuator controller 48 decreases the degrees of the nozzle opening of the variable turbo nozzle 23 and the opening of the EGR valve 32 from the fully opened state toward the fully closed state so that the degrees of the nozzle opening of the variable turbo nozzle 23 and the opening of the EGR valve 32 have inversely proportional relation with the amount of injected fuel or the degrees of the nozzle opening of the variable turbo nozzle 23 and the opening of the EGR valve 32 are decreased with a predetermined exponential function in accordance with increase of the amount of injected fuel. According to such a process, since intake air to the engine main body 2 is increased in accordance with increase of the amount of injected fuel and fuel is to be completely combusted in the combustion rooms, the manual forced regeneration process can be performed while suppressing increase of an amount of PM included in exhaust gas. Thus, the process of step S6 is completed and the intake control process proceeds to step S7.

In the process of step S7, the control portion 52 of the actuator controller 48 determines whether or not the degrees of the nozzle opening of the variable turbo nozzle 23 and the opening of the EGR valve 32 are both in the fully closed state. As a result of the determination, when both of the degrees of the nozzle opening of the variable turbo nozzle 23 and the opening of the EGR valve 32 are not in the fully closed state ("No" in step S7), the control portion 52 returns the intake control process to the process of step S6. On the contrary, when both of the degrees of the nozzle opening of the variable turbo nozzle 23 and the opening of the EGR valve 32 are in the fully closed state ("Yes" in step S7), the control portion 52 ends the series of intake control process. Then, the abovementioned processes are repeatedly performed for each predetermined control cycle. Accordingly, even during the manual forced regeneration process, light load operation can be performed without causing surging.

Figure 6:
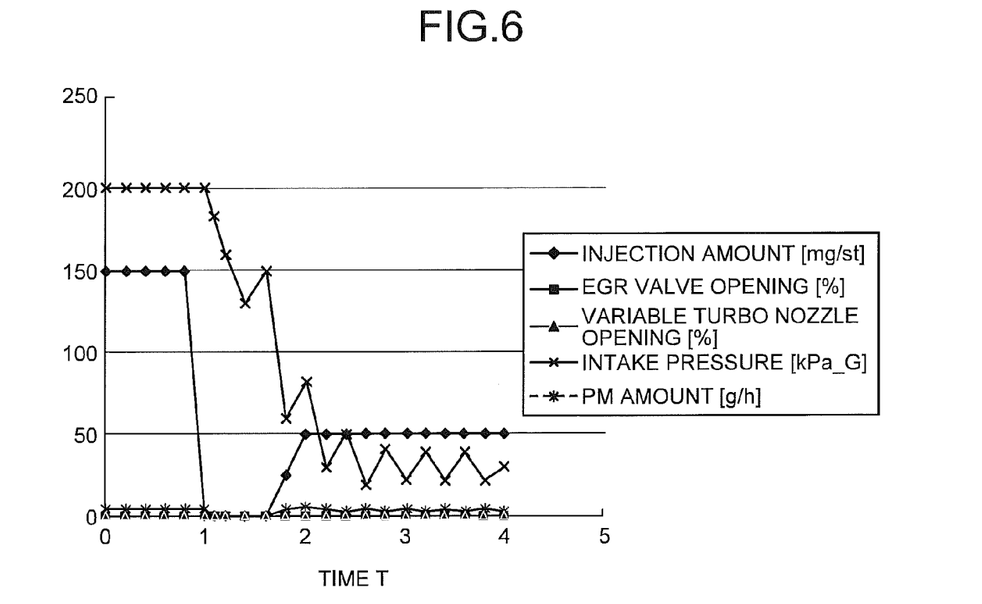
FIG. 6 is a view illustrating temporal variation of a fuel injection amount, an opening of an EGR valve, a nozzle opening of the variable turbo nozzle, intake pressure, and a PM amount in a case that the opening of the EGR valve is not controlled when a construction machine is abruptly decelerated during manual forced regeneration and light load operation.

FIG. 6 is a view indicating temporal variation of the amount of injected fuel, the degree of the opening of the EGR valve 32, the degree of the nozzle opening of the variable turbo nozzle 23, intake pressure, and the PM amount in a case that the construction machine is abruptly decelerated during the manual forced regeneration and during the light load operation. As illustrated in FIG. 6, in a case that the degree of the opening of the EGR valve 32 is not controlled when the construction machine is abruptly decelerated, surging occurs at the exhaust turbocharger 6 as the intake pressure being fluctuated.

Figure 7:
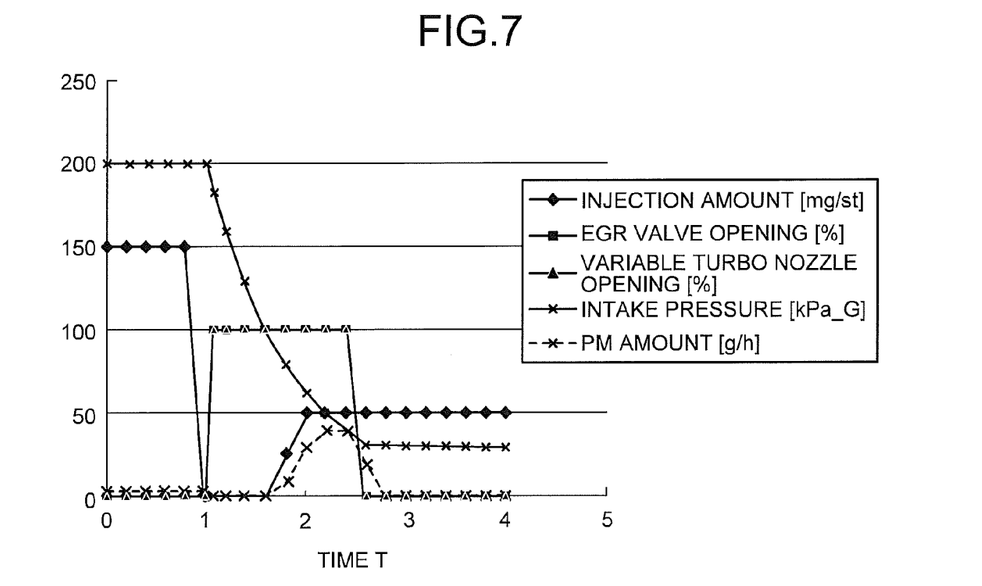
FIG. 7 is a view illustrating temporal variation of the fuel injection amount, the opening of the EGR valve, the nozzle opening of the variable turbo nozzle, the intake pressure, and the PM amount in a case that the degree of the opening of the EGR valve is controlled from a fully closed state to a fully opened state when the construction machine is abruptly decelerated during the manual forced regeneration and light load operation.

FIG. 7 is a view indicating temporal variation of the amount of injected fuel, the degree of the opening of the EGR valve 32, the degree of the nozzle opening of the variable turbo nozzle 23, intake pressure, and the PM amount in a case that the degree of the opening of the EGR valve 32 is controlled from the fully closed state to the fully opened state when the construction machine is abruptly decelerated during the manual forced regeneration and during the light load operation. As illustrated in FIG. 7, in a case that the degree of the EGR valve 32 is controlled from the fully closed state to the fully opened state when the construction machine is abruptly decelerated, it is possible to suppress surging occurrence of the exhaust turbocharger 6 due to fluctuation of the intake pressure. However, with the control of FIG. 7, the degree of the EGR valve 32 is maintained in the fully opened state until the amount of injected of fuel is rebounded to the idling fuel injection amount from zero. Accordingly, fuel is injected to the engine main body 2 in a state that an intake air amount is small until the degree of the EGR valve 32 is returned to the fully closed state from the fully opened state, so that fuel is incompletely combusted and a soot amount included in exhaust gas is increased.

Figure 8:
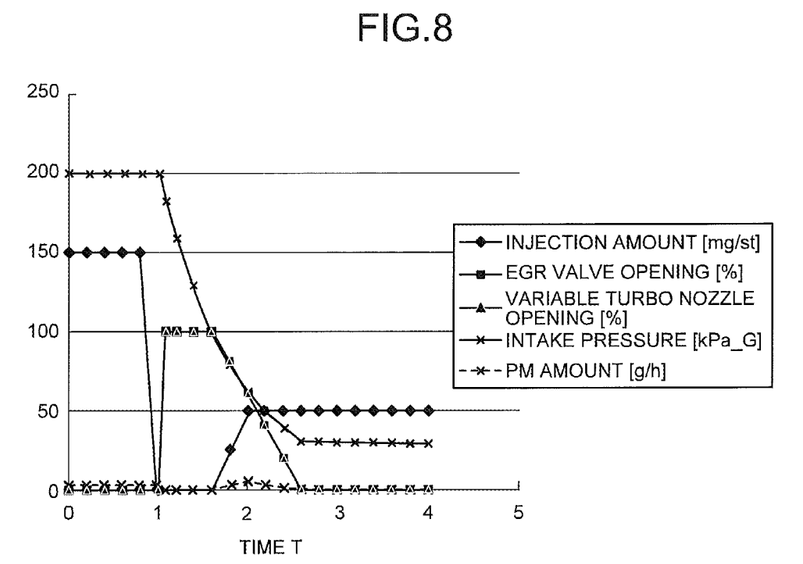
FIG. 8 is a view illustrating temporal variation of the amount of fuel injected, the opening of the EGR valve, the nozzle opening of the variable turbo nozzle, the intake pressure, and the PM amount in a case that the construction machine with the intake controller of the present embodiment is abruptly decelerated.

FIG. 8 is a view indicating temporal variation of the amount of injected fuel, the degree of the opening of the EGR valve 32, the degree of the nozzle opening of the variable turbo nozzle 23, intake pressure, and the PM amount in a case that the construction machine having the intake controller of the present embodiment is abruptly decelerated. As illustrated in FIG. 8, with the intake controller according to the present embodiment, surging occurrence at the exhaust turbocharger 6 is suppressed due to fluctuation of the intake pressure by controlling the degrees of the nozzle opening of the variable turbo nozzle 23 and the opening of the EGR valve 32 from the fully closed state to the fully opened state when the amount of injected fuel becomes zero. Further, with the intake controller according to the present embodiment, the degrees of the nozzle opening of the variable turbo nozzle 23 and the opening of the EGR valve 32 are decreased from fully opened state toward the fully closed state when the amount of injected fuel becomes unequal to zero. That is, with the intake controller of the present embodiment, an intake air amount to the engine main body 2 is increased in accordance with increase of the amount of injected fuel. Therefore, according to the intake controller of the present embodiment, since the intake air to the engine main body 2 is increased in accordance with increase of the amount of injected fuel and fuel is to be completely combusted in the combustion rooms, increasing of the PM amount included in exhaust gas can be suppressed.

In the above, description is performed on embodiments to which the invention invented by the inventors is applied. The present invention is not limited to the description and drawings of the abovementioned embodiments which form a part of disclosure of the present invention. That is, other embodiments, examples, implementation techniques and the like which are performed by a person skilled in the art based on the above embodiments are all included in the scope of the present invention.

REFERENCE SIGNS LIST

1 Internal combustion engine
2 Engine main body
3 Intake pipe
4 Exhaust pipe
5 Cooling mechanism
6 Exhaust Turbocharger 7 DPF (diesel particulate filter)
8 Exhaust gas recirculation system
21 Turbine
21a Turbine vane rotor
22 Compressor
23 Variable turbo nozzle
23a Variable turbo actuator
24 Bypass passage
25 Dosing nozzle
26 Dosing fuel supplying apparatus
31 Exhaust gas recirculation passage
32 EGR valve
32a EGR valve actuator
33 EGR cooler
41 Engine revolution speed sensor
42 Fuel injection amount sensor
43 Intake pressure sensor
44 Exhaust pressure sensor
45 Turbine revolution speed sensor
46 DPF regeneration instructing portion
47 Engine controller
48 Actuator controller
51 Input portion
52 Control portion
53 Output portion

The invention claimed is:

1. A turbocharged internal combustion engine, comprising:
an exhaust gas recirculation passage extracting a part of exhaust gas discharged from the internal combustion engine to recirculate the part of the exhaust gas to an intake passage side of the internal combustion engine;
an exhaust gas recirculation valve arranged at the exhaust gas recirculation passage to control a flow rate of the part of the exhaust gas to be circulated through the exhaust gas recirculation passage;
a fuel injection amount sensor detecting an amount of the fuel injected into the internal combustion engine;
a turbocharger comprising:
a turbine which is rotated by the exhaust gas exhausted from the internal combustion engine;
a compressor which is driven with rotation of the turbine to compress external air to the internal combustion engine; and
a variable turbo nozzle controlling a flow speed of the exhaust gas being supplied to the turbine; wherein a variable turbo nozzle includes a circular nozzle ring; wherein the circular nozzle ring includes a slide mechanism to adjust a nozzle opening and an opening forming a bypass passage to bypass an amount of the exhaust gas flowing in a turbine vane rotor via the circular nozzle ring when the circular nozzle ring is fully closed; and
a controller including:
an engine controller receiving an amount of the injected fuel detected by the fuel infection amount sensor;
an actuator controller having executable instructions stored in a non-transitory memory to:
fully close the exhaust gas recirculation valve and the variable turbo nozzle when a manual forced regeneration process of a diesel particulate filter is detected for reducing an amount of diesel particulate matter of the exhaust gas discharged from the internal combustion engine;
control the exhaust gas recirculation valve from the fully closed state to a fully opened state and the variable turbo nozzle from the fully closed state to a fully opened state; and
simultaneously close the bypass passage in response to the amount of the injected fuel detected by the fuel injection amount sensor being equal to zero during a light load operation.

2. The turbocharged internal combustion engine according to claim 1, wherein the actuator controller further includes executable instructions to decrease sizes of openings of the exhaust gas recirculation valve and the variable turbo nozzle in accordance with increasing in the amount of the injected fuel into the internal combustion engine detected by the fuel injection amount sensor.

3. A method of controlling intake air being supplied to a turbocharged internal combustion engine including:
an exhaust gas recirculation passage extracting a part of exhaust gas discharged from the internal combustion engine to recirculate the part of the exhaust gas to an intake passage side of the internal combustion engine;
an exhaust gas recirculation valve arranged at the exhaust gas recirculation passage to control a flow rate of the part of the exhaust gas to be circulated through the exhaust gas recirculation passage;
a turbocharger comprising:
a turbine which is rotated by the exhaust gas exhausted from the internal combustion engine;
a compressor which is driven with rotation of the turbine to compress external air to the internal combustion engine; and
a variable turbo nozzle controlling a flow speed of the exhaust gas being supplied to the turbine; and having a circular nozzle ring with a slide mechanism to adjust a nozzle opening,
the circular nozzle ring having an opening forming a bypass passage to bypass an amount of the exhaust gas flowing in a turbine vane rotor via the circular nozzle ring when the circular nozzle ring is fully closed, and
a controller including an engine controller and an actuator controller,
the method comprising:
during a light load operation,
detecting a manual forced regeneration process of a diesel particulate filter reducing an amount of diesel particulate material of the exhaust gas discharged from the internal combustion engine;
fully closing the exhaust gas recirculation valve and the variable turbo nozzle and simultaneously opening the bypass passage in response to the detection of the manual forced regeneration process;
detecting an amount of the fuel injected into the internal combustion engine via a fuel infection amount sensor; and
controlling the exhaust gas recirculation valve from the fully-closed state to a fully opened state and the variable turbo nozzle from the fully closed state to a fully opened state in response to the amount of fuel injected.

4. The method of controlling according to claim 3, further comprising decreasing sizes of openings of the exhaust gas recirculation valve and the variable turbo nozzle in accordance with increasing in the amount of the injected fuel into the internal combustion engine.

* * * * *